United States Patent
Gienger

(10) Patent No.: US 6,698,573 B2
(45) Date of Patent: Mar. 2, 2004

(54) APPARATUS FOR CENTERING PREFERABLY FLAT OBJECTS

(75) Inventor: Hans Gienger, Kronshagen (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 10/126,377

(22) Filed: Apr. 19, 2002

(65) Prior Publication Data

US 2002/0185798 A1 Dec. 12, 2002

(30) Foreign Application Priority Data

Jun. 9, 2001 (DE) .......................... 101 28 057

(51) Int. Cl.[7] .............................................. B65G 47/26
(52) U.S. Cl. ................. 198/456; 198/345.1; 414/788.9; 271/221; 271/223
(58) Field of Search .............................. 198/345.1, 456, 198/636; 271/220, 221, 223; 414/788.9, 789.1

(56) References Cited

U.S. PATENT DOCUMENTS

| 3,439,814 A | * | 4/1969 | Morain | ....................... 414/788 |
|---|---|---|---|---|
| 4,204,788 A | * | 5/1980 | Massey | ....................... 198/456 |
| 4,334,759 A | | 6/1982 | Clausing | |
| 4,412,769 A | | 11/1983 | Kollmann | |
| 4,613,268 A | * | 9/1986 | Capdeboscq et al. | ....... 198/407 |

FOREIGN PATENT DOCUMENTS

| DE | 31 07 438 A1 | 12/1981 |
|---|---|---|
| DE | 31 11 979 C2 | 1/1982 |

* cited by examiner

Primary Examiner—Gene O. Crawford
(74) Attorney, Agent, or Firm—Laurence A. Greenberg; Werner H. Stemer; Ralph E. Locher

(57) ABSTRACT

An apparatus for centering preferably flat objects, in particular, printing plates, includes a centering device with portion that can be moved, in particular, can be driven, in opposite directions with respect to one another. The portions are coupled to one another for movement such that, during the centering operation, they move jointly and uniformly toward an axis of symmetry, which, at the same time, is the centering axis for the object that is to be centered. The centering operation results in reliable alignment of the object, following which it is basically unnecessary to check the position of the object.

18 Claims, 2 Drawing Sheets

APPARATUS FOR CENTERING PREFERABLY FLAT OBJECTS

BACKGROUND OF THE INVENTION

Field of the Invention

The invention relates to an apparatus for centering objects, preferably, flat objects, and, in particular, printing plates, for feeding the objects into a processing machine, preferably, into a printing plate exposer, having a centering device with portions that can be moved, in particular, can be driven, in opposite directions to one another.

It is frequently the case that flat objects, such as disks, plates or the like, have to be centered before being transported further, in particular, for being fed in a precisely positioned manner into a following processing machine. Thus, a center axis of the object has to be aligned with a center axis or centering axis of a transporting path or of an introduction opening. Then, to start the feed operation, for example, an as far as possible automated check has to be made as to whether or not correct centering has taken place. For such a purpose, it is possible, in principle, to use light barriers. However, such an application is not possible, for example, when light-sensitive printing plates are to be fed in a centered manner into a printing plate exposer because the light of a light barrier would possibly be sufficient to expose these printing plates with adverse effect, even if infrared light were used as a precaution. Moreover, it would be necessary for light barriers or other sensors possibly to be disposed such that they run along in unison, for which purpose correspondingly high-outlay, tubular cable guides or the like would have to be provided.

In addition, a centering operation has to be switched off such that the centering forces applied by the centering device do not subject the objects that are to be centered to any damage or bending or other deformation following abutment of the centering device on both sides.

If a corresponding investigation establishes inadequate centering, then a correction movement has to take place, with the result that time-consuming and, ultimately, also cost-intensive determination and adjustment work has to be carried out.

SUMMARY OF THE INVENTION

It is accordingly an object of the invention to provide an apparatus for centering preferably flat objects that overcomes the hereinafore-mentioned disadvantages of the heretofore-known devices of this general type and that performs a centering operation that results in reliable alignment of the object, following which it is basically unnecessary to check the position of the object.

With the foregoing and other objects in view, there is provided, in accordance with the invention, an apparatus for centering objects having a symmetry axis, including a centering device having a centering axis and portions movable in directions opposite one another with respect to the centering axis, the portions coupled to one another to uniformly and jointly move, during a centering operation, toward the centering axis and move an object to place the symmetry axis at the centering axis. Preferably, the objects to be centered are flat objects, in particular, printing plates. Also preferably, the centering apparatus is a printing plate centering and feeding apparatus for a printing plate exposer.

According to the invention the centering device has portions coupled to one another for movement such that, during the centering operation, they move jointly and uniformly toward an axis of symmetry, which, at the same time, is the centering axis for the object that is to be centered.

Coupling the movements of the centering device according to the invention for a symmetrical movement ensures that the centering device butts against the object equally on both sides only when the alignment of the object has taken place in a precisely positioned manner. As a result, rather than the positioning having to be checked separately, all that is required is for the centering operation to be switched off to not further damage the object by further application of centering forces.

In accordance with another feature of the invention, the centering device has a circulating drive element with strands and each of the portions are disposed on different ones of the strands.

In accordance with a further feature of the invention, the strands move in opposite directions.

In accordance with an added feature of the invention, there is provided a drive moving the drive element in a circulation direction. The drive is moveably mounted to permit movement of the drive in a direction opposite the circulation direction.

To reliably avoid the situation where the object is damaged by the centering forces that continue to act throughout a possibly longer switching-off operation, another development of the invention provides that a drive, for example a motor, of the apparatus is mounted such that it can execute a movement in the opposite direction to the centering movement, in particular, in a direction opposite to the movement of a circulating drive element that has the centering device preferably disposed on its different strands. By virtue of such a measure according to the invention, the centering forces are advantageously converted fully automatically into a movement of the drive and are, thus, rendered harmless to the object as soon as the centering device butts against the object on both sides. The movement of the drive may be utilized, at the same time, as a switching-off movement for a switching-off operation, for example, by virtue of a lever or push-rod movement or by virtue of initiating a sensor at a location that is no longer disadvantageous to the printing plate.

It would likewise be possible for switching off to be initiated by virtue of checking the position of the centering device, but such a configuration is precisely what is preferably to be avoided. A development of the invention, thus, provides that the centering forces themselves are advantageously utilized for the switching-off operation as soon as abutment of the centering device on both sides, and thus, a centering operation, has taken place.

In accordance with an additional feature of the invention, there is provided a switching device connected to the centering device, the switching device completing the centering operation by stopping movement of the portions dependent upon a centering force acting against the centering device.

So that the object is, nevertheless, fixed by a certain centering force without being damaged, the switching-off movement can be made more difficult by a counteracting loading, for example, a spring loading, although it is possible for such a loading to be precisely predetermined at, and adjusted to, a desired magnitude.

In accordance with yet another feature of the invention, there is provided a load producing a force, the load connected to the drive to counter movement of the drive in the direction opposite the circulation direction with the force.

In accordance with yet a further feature of the invention, an object to be centered has sides and the centering force acting against the centering device is a contact by the portions against the sides of the object.

In accordance with yet an added feature of the invention, the switching device stops movement of the portions when the portions press the sides of the object.

In accordance with yet an additional feature of the invention, the portions are one of the group consisting of rods and plates.

In accordance with again another feature of the invention, there is provided a drive connected to the portions and driving the portion towards the centering axis.

With the objects of the invention in view, there is also provided a printing plate centering apparatus, including a centering device having a centering axis and portions movable in directions opposite one another with respect to the centering axis, and the portions coupled to one another to uniformly and jointly move, during a centering operation, toward the centering axis and move a printing plate to place a symmetry axis of the printing plate at the centering axis.

With the objects of the invention in view, there is also provided a printing plate centering and feeding apparatus for a printing plate exposer, including a centering device having a centering axis and portions movable in directions opposite one another with respect to the centering axis, and the portions coupled to one another to uniformly and jointly move, during a centering operation, toward the centering axis and move a printing plate to place a symmetry axis of the printing plate at the centering axis.

Other features that are considered as characteristic for the invention are set forth in the appended claims.

Although the invention is illustrated and described herein as embodied in an apparatus for centering preferably flat objects, it is, nevertheless, not intended to be limited to the details shown because various modifications and structural changes may be made therein without departing from the spirit of the invention and within the scope and range of equivalents of the claims.

The construction and method of operation of the invention, however, together with additional objects and advantages thereof, will be best understood from the following description of specific embodiments when read in connection with the accompanying drawings.

DESCRIPTION OF THE PREFERRED EMBODIMENTS

Figure 1:
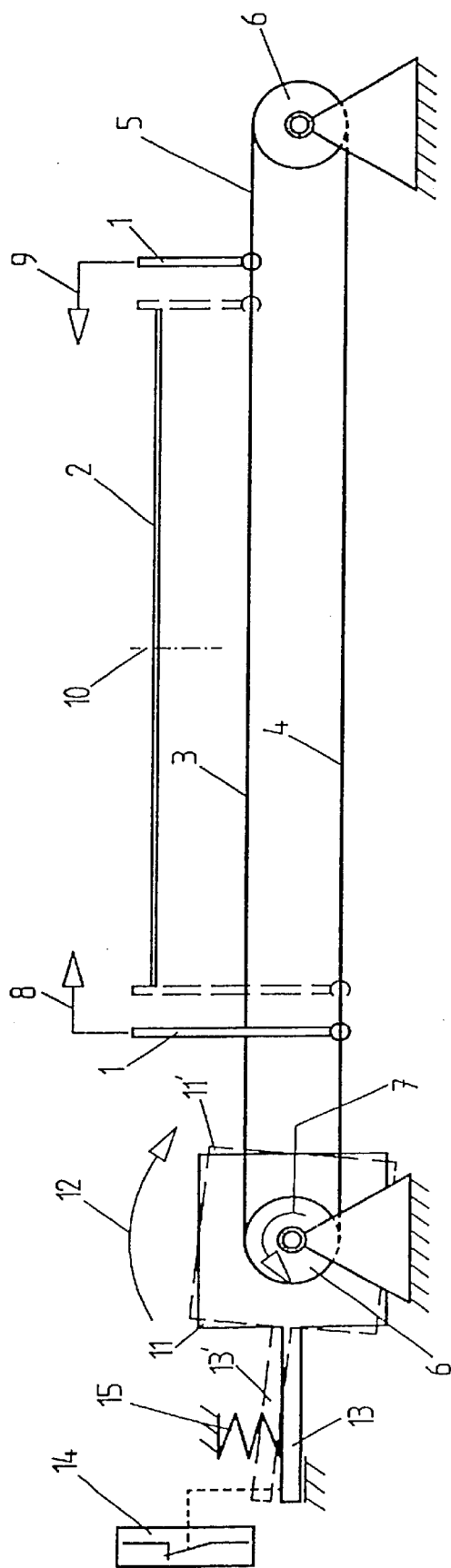
FIG. 1 is a diagrammatic side view of a centering apparatus according to the invention.

Referring now to the figures of the drawings in detail and first, particularly to FIG. 1 thereof, there is shown, schematically, a side view of a centering apparatus according to the invention. The centering apparatus has centering devices 1 for centering a flat object 2. The devices 1 can take any shape, including rods and plates. The centering devices are disposed on different strands 3, 4 of a circulating drive element 5. In particular, the drive element 5 is a belt or wire and the strands are each a portion of the belt or wire not in direct contact with the pulleys 6. If the drive element 5, which circulates through deflecting pulleys 6, is driven in the counterclockwise direction, i.e., in the direction of the arrow 7, then the centering devices 1 move uniformly and symmetrically toward one another in the direction of the arrows 8, 9 and, finally, align between them the center axis of the object 2 with the axis of symmetry or centering axis 10.

A drive means or subassembly 11 is provided for driving the drive element 5. The drive subassembly 11 is, itself, rotatably mounted because if the centering devices 1 butt against the object 2 on both sides, the continued driving of the drive element 5 in the direction of the arrow 7 is blocked and the persisting centering forces of the centering devices 1, instead, cause the drive subassembly 11 to be rotated in the opposite direction, in the direction of the arrow 12, as is also indicated by dashed contour lines of the drive subassembly 11'.

Disposed on the drive subassembly 11, 11' is a lever arm 13, 13' that pivots along in unison and, by virtue of the pivoting movement in the direction of the arrow 12, actuates (indicated by a dashed line) a switch 14 directly through a push rod or the like or indirectly by the initiation of a sensor. As a result of the switch 14 actuation, the apparatus is switched off. The movement of the drive subassembly 11, 11' takes place counter to a spring 15, by way of which the drive subassembly 11 is stabilized in its position during the actual centering operation and, following abutment of the centering devices 1 against the object, a certain centering force builds up without damaging or deforming the object.

For feeding the centered object into a processing machine, the object has to be released, if appropriate, from the centering devices, which is possible by initiating an opening movement of the centering device counter to the direction of the arrow 7.

Figure 2:
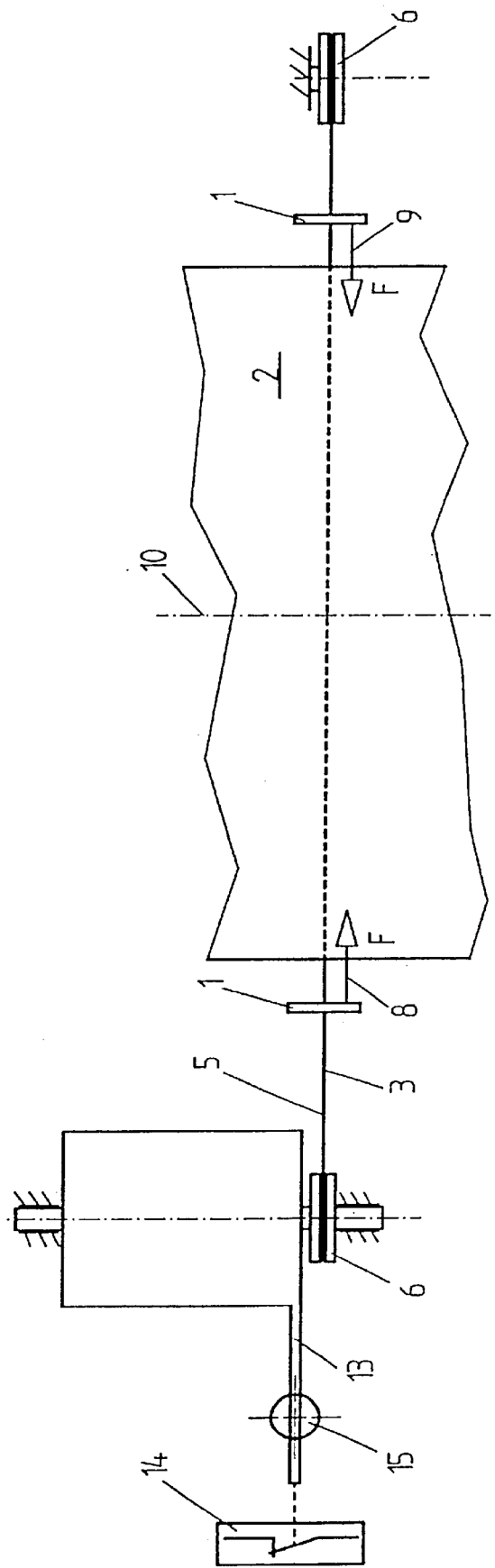
FIG. 2 is a fragmentary, plan view and partially cross-sectional view of the apparatus of FIG. 1.

FIG. 2 is a plan view, partly in cross-section, of the apparatus according to FIG. 1. The same components have the same designations as in FIG. 1. FIG. 2, in particular, illustrates the sliding form of the centering devices 1, and "F" is used to indicate that a force that could also be harmful to the object 2 acts in each of the centering directions 8, 9.

I claim:

1. An apparatus for centering objects having a symmetry axis, comprising:
   a centering device having:
      a circulating drive element with strands;
      a centering axis; and
      portions movable in directions opposite one another with respect to said centering axis, each of said portions are disposed on different ones of said strands;
   said portions coupled to one another to uniformly and jointly move, during a centering operation, toward said centering axis and move an object to place the symmetry axis at said centering axis;
   a drive moving said drive element in a circulation direction, siad drive moveably mounted to permit movement of said drive in a direction opposite said circulation direction.

2. The apparatus according to claim 1, wherein said strands move in opposite directions.

3. The apparatus according to claim 1, wherein the objects are flat objects.

4. The apparatus according to claim 1, wherein said portions are one of the group consisting of rods and plates.

5. The apparatus according to claim 1, wherein said drive is connected to said portions and drives said portion towards said centering axis.

6. The apparatus according to claim 1, including a load producing a force, said load connected to said drive to counter movement of said drive in said direction opposite said circulation direction with said force.

7. The apparatus according to claim 6, including a switching device connected to said centering device, said switching device completing the centering operation by stopping movement of said portions dependent upon a centering force acting against said centering device.

8. The apparatus according to claim 7, wherein:

an object to be centered has sides; and said centering force acting against said centering device is a contact by said portions against the sides of the object.

9. An apparatus for centering objects having a symmetry axis and sides, comprising:

a centering device having:

a centering axis; and portions movable in directions opposite one another with respect to said centering axis;

said portions coupled to one another to uniformly and jointly move, during a centering operation, toward said centering axis and move the object to place the symmetry axis at said centering axis; and a switching device being connected to said centering device and completing the centering operation by stopping movement of said portions dependent upon a centering force acting against said centering device through contact by said portions against the sides of the object.

10. The apparatus according to claim 9, wherein said switching device stops movement of said portions when said portions press the sides of the object.

11. The apparatus according to claim 9, wherein the objects are flat objects.

12. The apparatus according to claim 9, wherein said portions are one of the group consisting of rods and plates.

13. The apparatus according to claim 9, including a drive connected to said portions and driving said portion towards said centering axis.

14. An apparatus for centering objects having a symmetry axis, comprising:

a centering device having:

a centering axis; and portions movable in directions opposite one another with respect to said centering axis;

said portions coupled to one another to uniformly and jointly move, during a centering operation, toward said centering axis and move an object to place the symmetry axis at siad centering axis; and a switching device connected to said centering device, said switching device completing the centering operation by stopping movement of said portions dependent upon a centering force acting against said centering device.

15. The apparatus according to claim 8, wherein:

an object has sides; and said switching device stops movement of said portions when said portions press the sides of the object.

16. The apparatus according to claim 14, wherein the objects are flat objects.

17. the apparatus according to claim 14, wherein said portions are one of the group consisting of rods and plates.

18. The spparatus according to claim 14, including a drive connected to said portions and driving said portion towards said centering axis.

* * * * *